United States Patent [19]
Schmit

[11] Patent Number: 6,148,438
[45] Date of Patent: Nov. 14, 2000

[54] SYSTEM AND METHOD FOR CREATING COMPOSITE CLASSES FOR OBJECTS HAVING VIRTUAL FUNCTIONS FOR AVOIDANCE OF USER MODE/KERNEL MODE TRANSITIONS

[75] Inventor: Geoffrey Schmit, Austin, Tex.

[73] Assignee: National Instruments Corporation, Austin, Tex.

[21] Appl. No.: 09/003,391

[22] Filed: Jan. 6, 1998

[51] Int. Cl.$^7$ ..................................................... G06F 9/445
[52] U.S. Cl. .......................... 717/5; 717/1; 717/2; 707/8; 707/302
[58] Field of Search ..................................... 717/1, 2, 3, 4, 717/5, 6, 7, 8, 9, 10, 11; 707/8, 302

[56] References Cited

U.S. PATENT DOCUMENTS

| | | | |
|---|---|---|---|
| 5,418,956 | 5/1995 | Willman | 709/302 |
| 5,481,718 | 1/1996 | Ryu et al. | 709/303 |
| 5,572,733 | 11/1996 | Ryu et al. | 717/1 |
| 5,594,836 | 1/1997 | Ryu et al. | 706/53 |
| 5,842,018 | 11/1998 | Atkinson et al. | 707/501 |
| 5,845,280 | 12/1998 | Treadwell, III et al. | 707/8 |

OTHER PUBLICATIONS

Germond et al., "Object Mapping in C++" Technical Articles: C/C++–MSDN Library, Mar. 20, 1992, Microsoft Corporation, pp. 1–11.
Stroustrup, B., "The C++ Programming Language" Third Ed., AT&T Labs, Addison–Wesley Publishing Company, 1997, pp. 310–312; 390–391.
Microsoft Product Support Service, http://support.microsoft.com/support/kb/articles/q191/8/40.asp, "Howto: Share Memory Between User Mode and Kernel Mode", Jan. 2000.
Microsoft online library, http://msdn.microsoft.com/library/partbook/uml/compositeobjects.htm, "Composite Objects", pp. 1, 1997.
Horstmann, Microsoft online library, http://msdn.microsoft.com/library/techart/msdn_cpptocom.htm, "From CPP to COM", Oct. 1995.
Banerjee et al., "Data Model Issues for Object Oriented Application", ACM, pp. 3–26, Jan. 1987.
Bacon et al., "Fast Static Analysis of C + + Virtual Function Calls", ACM, pp. 324–341, Oct. 1996.
Liedtke, "On micro–Kernel Construction", ACM, pp. 237–250, Dec. 1995.
Driesen et al., "The Direct Cost of Virtual Function Calls in C +", ACM, pp. 306–323, Oct. 1996.
Magnan et al., "From Specification to Management of Composite Object Behavior", IEEE, pp. 132–146, Aug. 1998.

*Primary Examiner*—Tariq R. Hafiz
*Assistant Examiner*—Ted T. Vo
*Attorney, Agent, or Firm*—Conley, Rose & Tayon; Jeffrey C. Hood

[57] ABSTRACT

A system and method for creating composite classes for objects having virtual functions, wherein the composite classes enable avoidance of user mode/kernel mode transitions in the operating system. The method first comprises defining the class A, an empty class, and a composite class of the class A and the empty class. These classes are defined in the software program at compile time. The composite class inherits from the composite class and the empty class. The composite class comprises a first mode interface and a second mode interface, wherein the first mode interface and the second mode interface have an opposite ordering of base classes. During execution, the software program instantiates a composite object from the composite class. The method then modifies the composite object to enable the composite object to be shared directly between the first and second modes with reduced mode transitions.

33 Claims, 9 Drawing Sheets

Instance Of Class A

Instance Of Class B

Instance Of Class C

Instance Of Class D

Class A

Class e

Class comA

SYSTEM AND METHOD FOR CREATING COMPOSITE CLASSES FOR OBJECTS HAVING VIRTUAL FUNCTIONS FOR AVOIDANCE OF USER MODE/KERNEL MODE TRANSITIONS

BACKGROUND

1. Field of the Invention

The present invention relates to a system and method for creating composite classes for objects having virtual functions, wherein the composite classes enable avoidance of user mode/kernel mode transitions in the operating system.

2. Description of the Related Art

A common need in many software programs, such as device driver programs, is the ability to use an object in both user and kernel modes. However, an object which contains virtual functions, and hence a virtual function table pointer, cannot be shared directly between user and kernel mode. Sharing is not possible for objects which include virtual functions for the following reason. When a virtual function of the object is called, the address of the function is retrieved from the object's virtual function table. The object itself contains a pointer to its virtual function table, referred to as vfptr, and this pointer is used to retrieve the address of the virtual function that is called. If an object is created in the kernel, the object's virtual function table pointer (vfptr) will be a kernel pointer, which is inaccessible in user mode under some operating systems. If an object is created in user mode, the object's virtual function table pointer (vfptr) will be a user pointer which may be invalid in the kernel if the user mode process is not in context. Therefore due to these virtual function table pointers, objects that contain virtual functions cannot be directly shared between user and kernel modes.

One way to work around this problem is to implement a "proxy design pattern". The proxy design pattern creates a proxy object in user mode that forwards requests to the real object in kernel mode. However, this forwarding of requests involves a user to kernel mode transition. A user to kernel mode transition is an expensive operation in terms of time, i.e., CPU cycles. With the use of proxies, whenever a request is made of a proxy object, this user to kernel mode transition occurs. This time penalty can be unacceptable for operations that require fast execution, such as memory allocation and manipulation.

Quantitative Benchmarks of User to Kernel Mode Transition Costs

Below are benchmarks that were compiled to compare the time duration that a function call takes to complete when the caller and the callee are in the same executable versus when the callee is in the kernel and a user to kernel mode transition is required. The experiments were done using two different computers: a Dell Dimension XPS p166c and a 486 machine whose CPU has been upgraded to Evergreen 586 100 MHz. It is noted that the benchmark results should not be treated as absolute numbers, because the numbers depend on the environment (CPU, compiler, machine, memory state, register values, etc.) in which the experiment was conducted.

| Dell P166 | |
|---|---|
| Windows NT: | |
| local | 72.6 |
| kernel | 34600 |
| Windows 95: | |
| local | 85.1 |
| kernel | 6840 |
| Evergreen 586 100 MHz | |
| Windows NT: | |
| local | 446 |
| kernel | 138000 |
| Windows 95: | |
| local | 473 |
| kernel | 26100 |

From the above benchmark figures it is readily apparent that function calls involving user to kernel mode transitions are much more expensive than function calls within the same executable (especially under Windows NT). Thus the use of proxies to solve the object sharing problem is not sufficient in some circumstances.

Therefore, an improved system and method is desired for enabling use of objects which comprise virtual functions in both user and kernel modes, wherein this usage does not require, or requires a reduced number of, user mode/kernel mode transitions.

SUMMARY OF THE INVENTION

The present invention comprises a system and method for creating composite classes for objects having virtual functions, wherein the composite classes enable avoidance of user mode/kernel mode transitions in the operating system. More generally, the present invention includes a method for enabling access to an object in both first and second modes with reduced mode transitions, wherein the object is of a class A. In the preferred embodiment, the first mode comprises one of user mode or kernel mode, and the second mode comprises the other of user mode or kernel mode.

The method first comprises defining the class A, an empty class, and a composite class of the class A and the empty class. These classes are defined in the software program at compile time. The class A includes one or more virtual functions and a virtual function table pointer, and the class A defines a first mode or second mode vector table pointer in either second or first mode, respectively, e.g., the class A defines a second mode vector table pointer in the first mode, such as a kernel vector table in user mode. The empty class includes a virtual function, wherein the empty class includes a virtual function table pointer. The composite class inherits from the class A and the empty class. The composite class comprises a first mode interface and a second mode interface, wherein the first mode interface of the composite class comprises a first order of base classes, and the second mode interface of the composite class comprises a second ordering of base classes opposite the first order. The composite class also includes a placeholder member in the mode where the vector table pointer is not located to ensure the same number of entries in each mode.

During execution, the software program instantiates a composite object from the composite class in one or more of the first mode or the second mode. If the composite object is instantiated in the second mode, the method comprises changing the virtual function table pointer for the empty class in the composite object to the first mode virtual function table pointer for class A. If the composite object is instantiated in the first mode, the method comprises storing the second mode virtual function table pointer for class A in the second mode vector table pointer. As a result, the composite object can be shared directly between the first and second modes with reduced mode transitions.

Thus, if the composite object is instantiated in, for example, the first mode, a second mode process is able to utilize a virtual function of the composite object after instantiating the composite object in the first mode, wherein the second mode process can use the virtual function of the composite without requiring a mode transition.

The design and use of composite classes according to the present invention eliminates the need for many user/kernel transitions. Composite classes take advantage of multiple inheritance and virtual function table pointers in order to avoid these transitions and allow direct sharing of objects with virtual functions between user and kernel modes.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
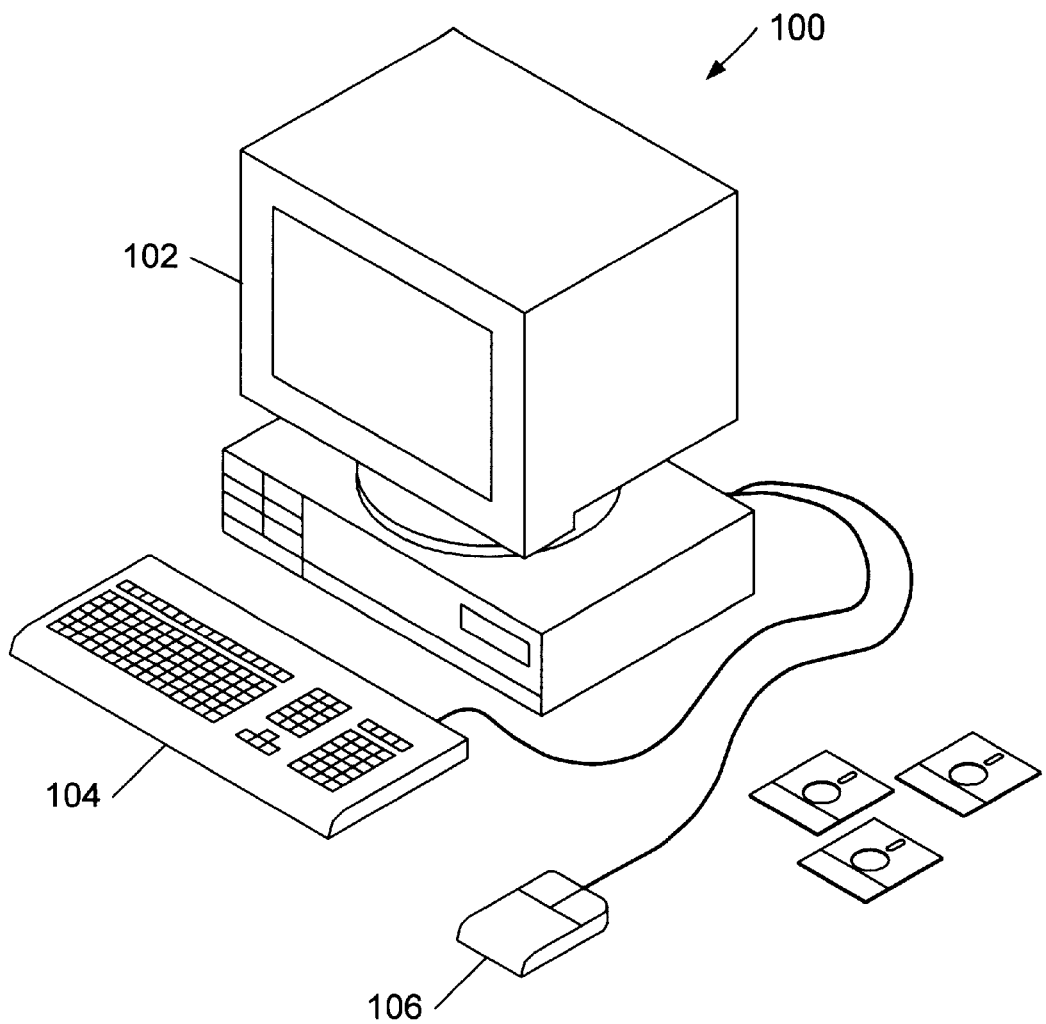
FIG. 1 illustrates a computer system utilizing the present invention.

Referring now to FIG. 1, an illustrative computer system 100 which is programmed according to the present invention and which operates according to the present invention is shown. The computer system 100 preferably comprises a video display screen 102, a keyboard 104, and a mouse 106 as shown. The computer system 100 also includes various standard components, including at least one central processing unit (CPU), a memory, a hard drive, one or more buses, and a power supply.

The computer system 100 preferably includes a memory media, such as an installation media, e.g., floppy disk(s) or a CD-ROM, a system memory, e.g., DRAM, and/or a non-volatile memory, e.g., a hard drive, on which computer programs according to the present invention are stored. In the preferred embodiment, the present invention comprises a software program stored on the memory and/or hard drive of the computer 100 and executed by the CPU. The CPU executing code and data from the memory thus comprises a means for executing the steps described below. The computer system 100 may thus be used to create composite classes and/or objects according to the present invention, wherein these composite classes and/or objects include virtual functions and can be used in both user and kernel modes with reduced user mode/kernel mode transitions, as described below.

Figure 2:
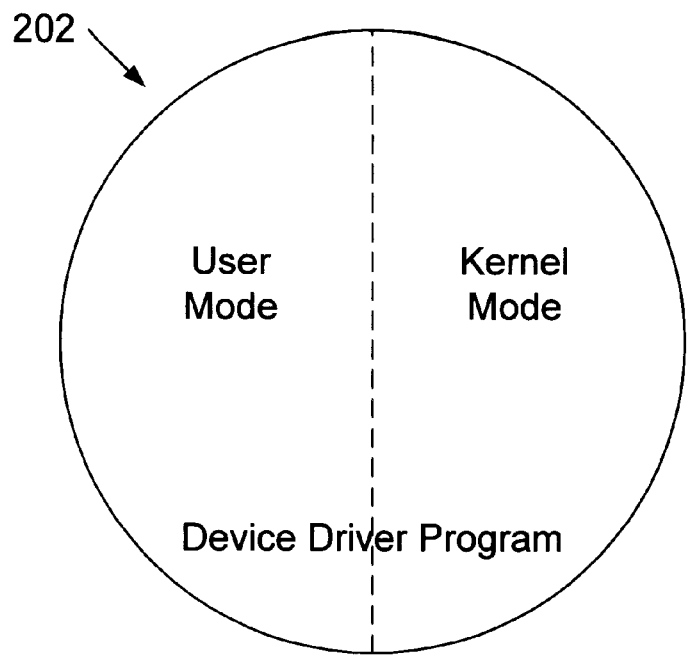
FIG. 2 illustrates the software components comprised in the computer system of FIG. 1.
Figure 2:
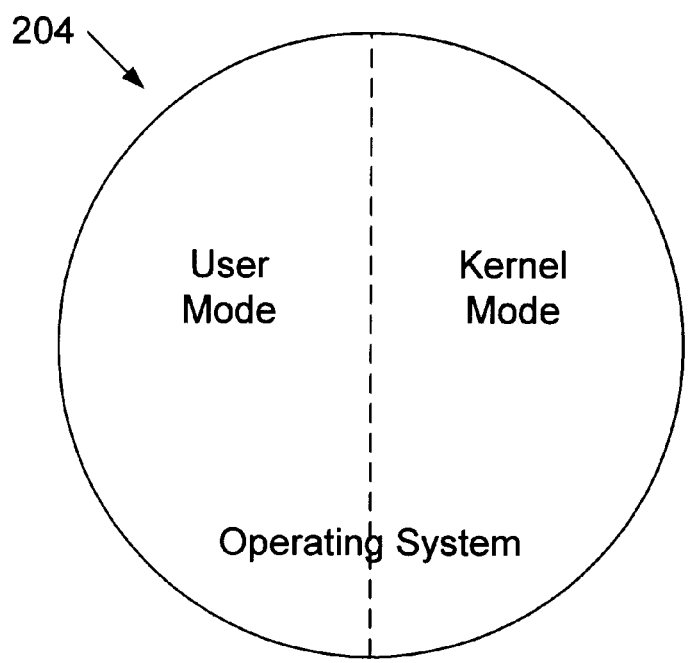

FIG. 2—Software Components

FIG. 2 illustrates the software components comprising the system and method of the present invention. As shown, the software components include a device driver program 202 and an operating system 204. Both the device driver program 202 and the operating system 204 are comprised or stored on the memory of the computer system and are executed by the CPU of the computer system.

The device driver program 202 preferably includes a user mode portion and a kernel mode portion. In the preferred embodiment, the device driver program is the NI-DAQ driver level software available from National Instruments Corporation. The NI-DAQ software comprises a user mode DLL (dynamic linked library) and a kernel mode driver. The operating system 204 may be any of various types, and is preferably a Windows based operating system, such as Windows 95, Windows 98 or Windows NT, or their successors, from Microsoft Corporation. As shown, the operating system includes both a user mode portion and a kernel mode portion. It is noted that various other software components or elements may be comprised in the computer system as desired.

The device driver program 202 preferably includes the software according to the present invention which is operable or executable to create a composite class and instantiate an instance of the composite class, referred to as a composite object, to allow the composite object to be shared in both user and kernel modes with a reduced number of user mode/kernel mode transitions.

FIGS. 3–6: Background

The following comprises examples of classes including virtual functions and their corresponding appearance in memory. FIGS. 3–6 demonstrate basic concepts, such as how instances of classes appear in memory as well as the inheritance between classes.

In the following description, the discussion of class organization and virtual function tables is specific to the Microsoft Visual C++ compiler. It is noted that the present invention and/or the concepts included herein are readily applicable to other compilers. Also, it is assumed that the objects are instantiated into user address space, regardless of whether the instantiation is taking place in kernel or user mode. This is necessary in Windows NT because kernel mode address may never be dereferenced in user mode.

As an example, assume the existence of a class referred to as class A:

```
Class A
{
    int dA1;
    int dA2;
    virtual int vfA1;
    virtual int vfA2;
};
```

Figure 3:
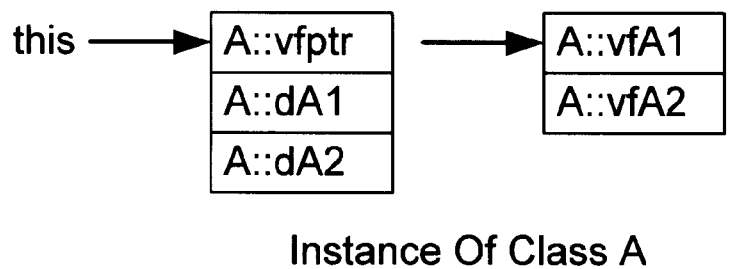
FIGS. 3–6 illustrate the appearance of various instances of classes in memory.

When an instance of class A is instantiated, the instance has an appearance in memory as shown in FIG. 3.

Now assume a class B is created which inherits from class A:

```
class B: public A
{
    int dB1;
    int dB2;
    virtual int vfA1;
    virtual int vfB2;
};
```

Figure 4:
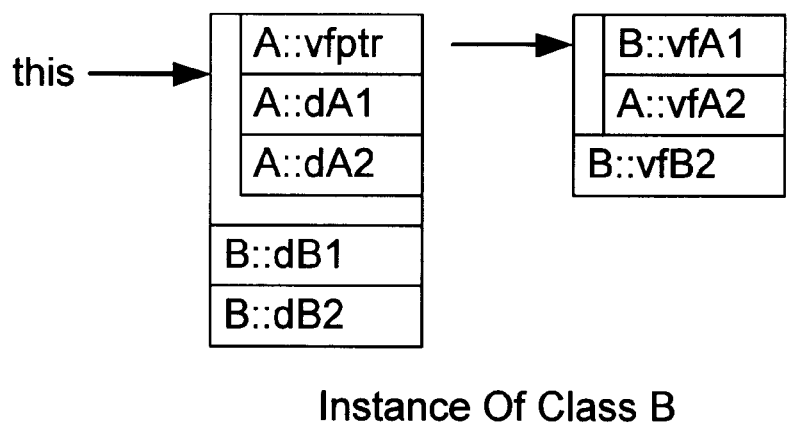

When an instance of class B is instantiated, the instance has an appearance in memory as shown in FIG. 4.

Now assume a class C is created which is similar to class A:

```
class C
{
    int dC1;
    int dC2;
    virtual int vfC1;
    virtual int vfC2;
};
```

Figure 5:
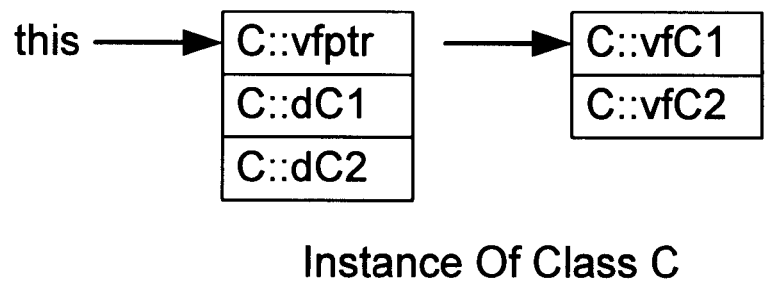

When an instance of class C is instantiated, the instance has an appearance in memory as shown in FIG. 5.

Now assume a class D is created which inherits from both A and C:

```
class D: public A, public C
{
    int dD1;
    int dD2;
    virtual int vfA1;
    virtual int vfD2;
};
```

Figure 6:
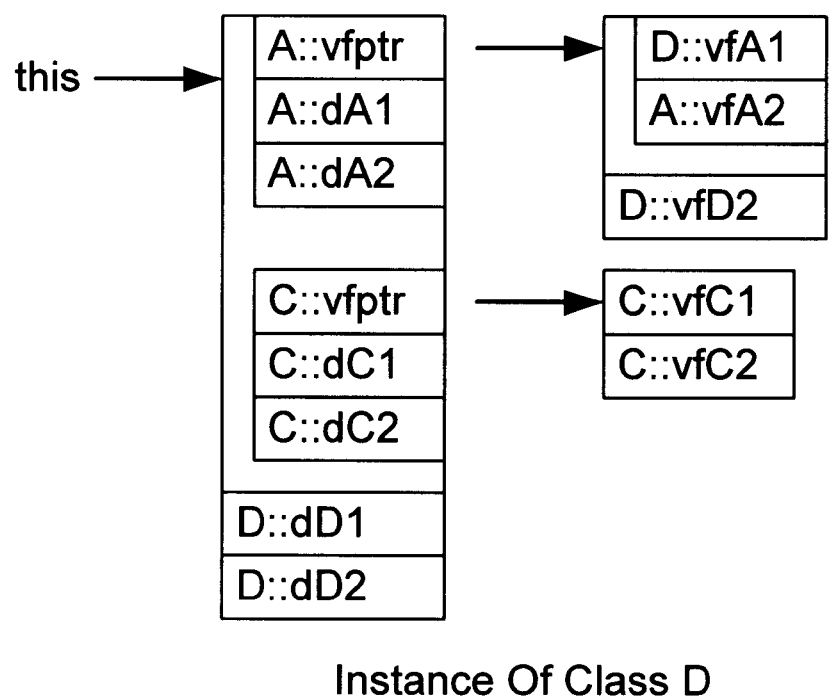

When an instance of class D is instantiated, the instance has an appearance in memory as shown in FIG. 6.

Figure 7:
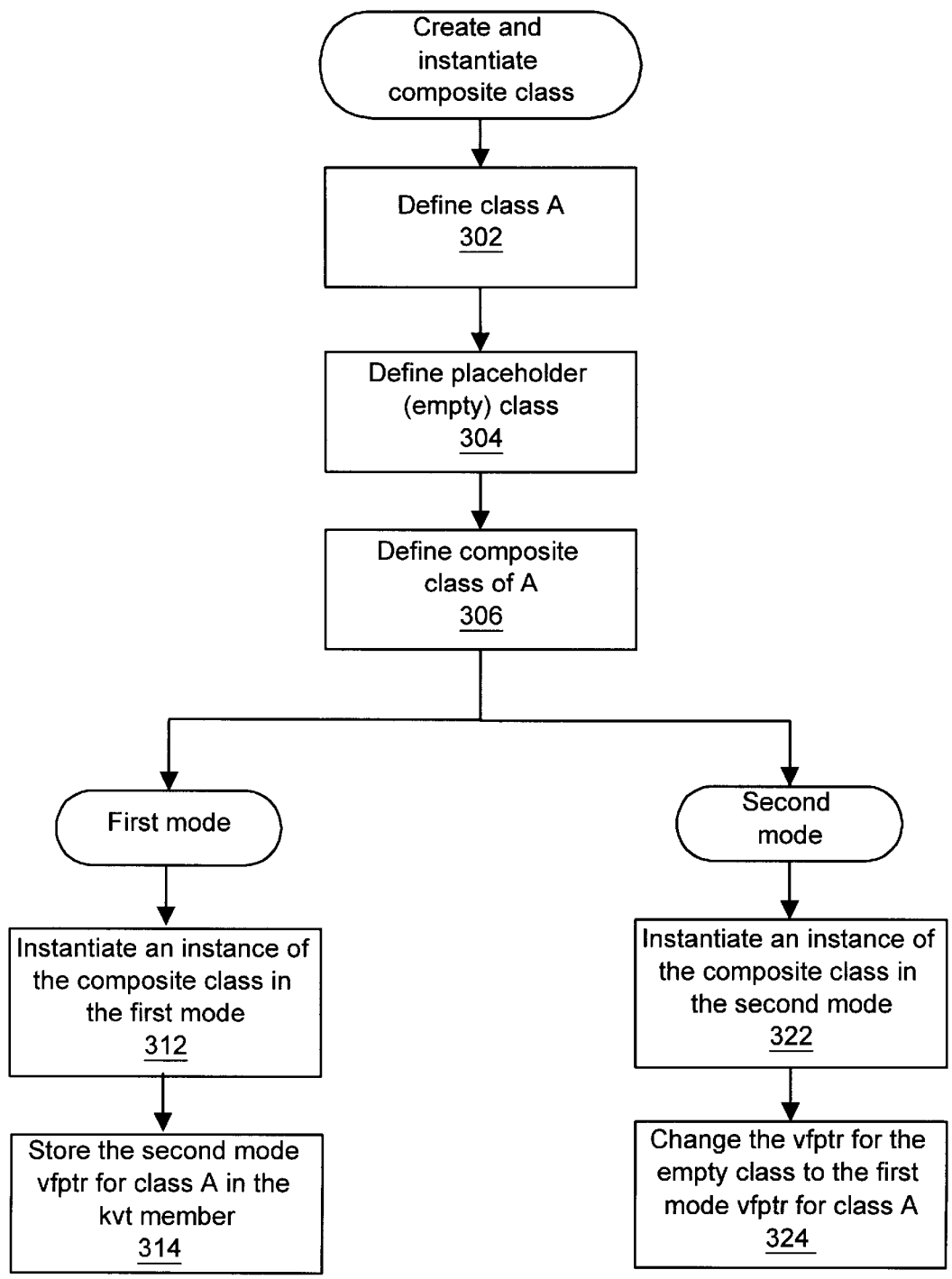
FIG. 7 is a flowchart diagram illustrating operation of the preferred embodiment of the present invention.

FIG. 7—Flowchart of Operation of the Present Invention

FIG. 7 is a flowchart diagram which illustrates the use and operation of the present invention. In the following discussion, the term "first mode" is used to refer to one of user mode or kernel mode, and the term "second mode" is used to refer to the other of user mode or kernel mode.

It is noted that in the following discussion, the assumptions recited above also apply. First, the discussion of class organization and virtual function tables below is specific to the Microsoft Visual C++ compiler. Further, it is assumed that objects are instantiated into user address space regardless of whether the instantiation occurs in kernel or user mode. As noted above, this is necessary in Windows NT because a kernel mode address may never be dereferenced in user mode.

As discussed above, the method of the present invention is executed by a software program. As shown, in step 302 the software program defines a class, referred to as, for example, class A. The class A includes one or more virtual functions and a virtual function table pointer. The class A defines a first mode or a second mode vector table pointer in the other of either the first mode or the second mode. More particularly, the class A defines a kernel mode vector table pointer in user mode, or defines a user mode vector table pointer in kernel mode. In this description, the class A defines a second mode vector table pointer in the first mode. As noted above, the first and second modes can be either of user mode or kernel mode.

In step 304 the software program or method defines a placeholder class or empty class. An example interface for this empty class, referred to as class e, is included below. The empty class includes a virtual function and includes a virtual function table pointer.

In step 306 the software program or method defines a composite class of A. The composite class inherits from the class A and the empty class. The composite class comprises a first mode interface and a second mode interface, wherein the first mode interface of the composite class comprises a first order of base classes, and wherein the second mode interface of the composite class comprises a second ordering of base classes opposite the first order. For example, the composite class of A comprises an interface in user mode and a different interface in kernel mode. Thus, according to the preferred embodiment of the invention, the ordering of the base classes in the interface is reversed for the user mode interface and the kernel mode interface.

In the preferred embodiment, the class A, the empty class, and the composite class are defined by the software program in steps 302, 304, and 306 at compile time. In other words, steps 302–306 are performed during compile time of the software program.

After the above classes are defined in steps 302–306 and the program is compiled, the program is then executed. During program execution, when an object of the composite class is desired to be used, a composite object of the composite class is instantiated in one of either the first mode or the second mode. If the composite object is instantiated in the first mode, then steps 312 and 314 are executed.

As shown, when the composite object is instantiated in the first mode in step 312, then in step 314 the method operates to store the second mode virtual function table pointer for class A in the second mode v-table pointer (kvt) member. Thus, when the composite object is instantiated in the first mode, the composite object is amended to include the second mode virtual function table pointer for class A. Thus, if a second mode software process desires to access the virtual function table of the composite object, which has been instantiated in the first mode, a mode transition is not required, but rather the virtual function table pointer which exists in the second mode can be used from the instantiated object to access the virtual function table.

When the composite object is instantiated in the second mode in step 322, then in step 324 the method operates to change the virtual function table pointer (vfptr) for the empty class to the first mode virtual function table pointer (vfptr) for class A. Thus, after step 324, the composite object has been amended to include the first mode virtual function table pointer for class A. Thus, if a first mode software process desires to access the virtual function table of the composite object, which has been instantiated in the second mode, this first mode pointer can be used to reference the virtual function table without requiring a mode context switch.

Thus, when the composite object is instantiated in the first mode, a second mode process is able to utilize a virtual function of the composite object after the composite object is instantiated in the first mode, wherein the second mode process can use the virtual function of the composite object without requiring a mode transition. Likewise, when the composite object is instantiated in the second mode, a first mode process is able to utilize a virtual function of the composite object after the composite object is instantiated in the second mode, wherein the first mode process can use the virtual function of the composite object without requiring a mode transition.

As noted above, the first mode comprises one of user mode or kernel mode, and the second mode comprises the other of user mode or kernel mode. The present invention can be implemented in either of two embodiments, depending on whether the class A defines a vector table pointer in the first mode or the second mode, i.e., whether the class A defines a kernel vector table pointer in user mode or a user vector table pointer in kernel mode.

Figure 7A:
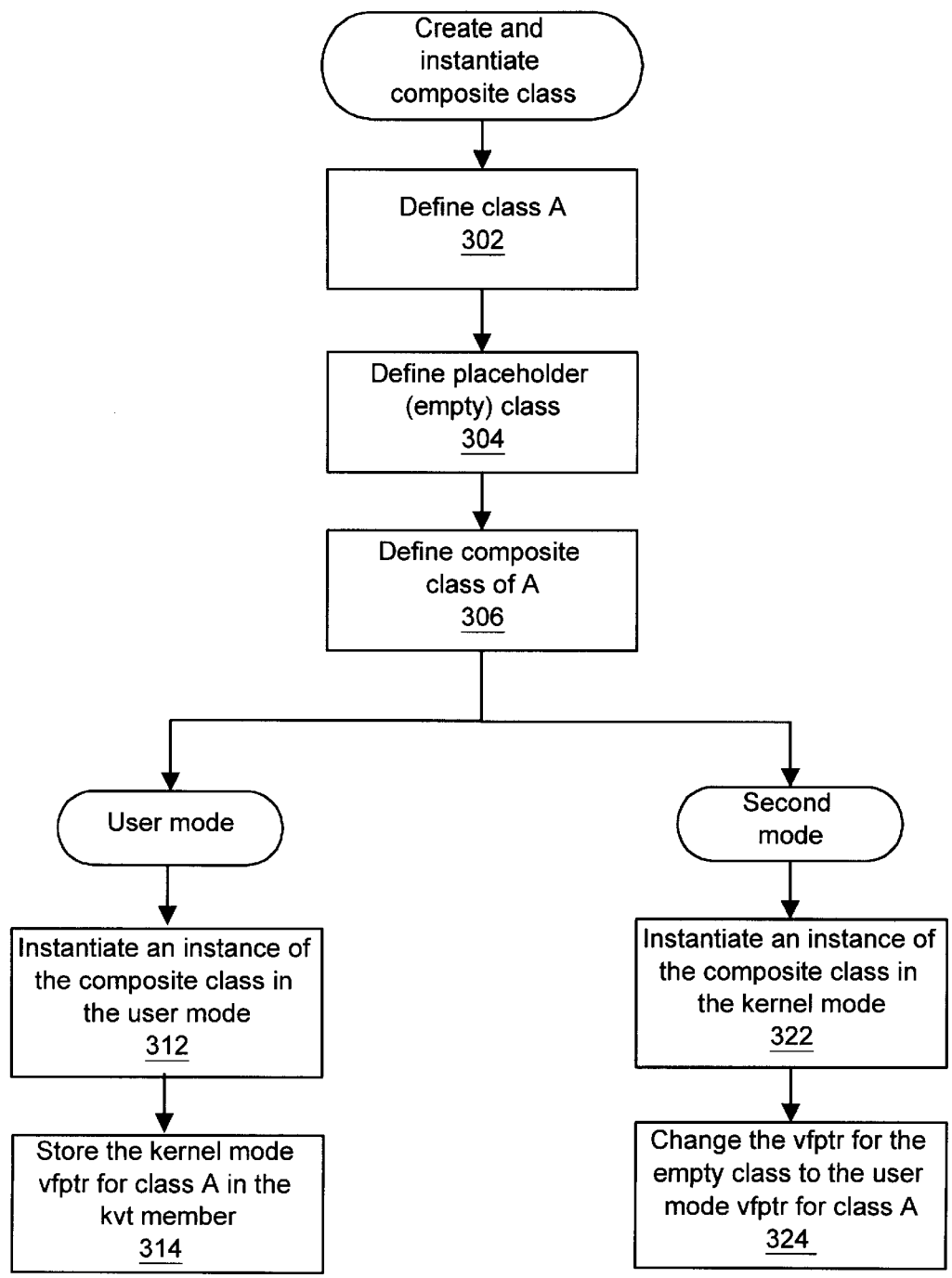
FIG. 7A is a flowchart diagram illustrating an example operation of the preferred embodiment of the present invention.

FIG. 7A—Flowchart of Operation of the Present Invention

FIG. 7A is a flowchart diagram which illustrates the use and operation of the present invention. In FIG. 7A, the class A defines a kernel vector table pointer in user mode. Thus, FIG. 7A illustrates a specific embodiment where the class A defines the kernel vector table pointer in user mode. It is noted that the method of the present invention also operates where the class A defines a user vector table pointer in kernel mode, although this embodiment is not shown.

FIG. 7A is best understood with reference to FIGS. 8–11, which illustrate an example of the operation of the present invention in accordance with the embodiment of FIG. 7A. In FIG. 7A, reference numerals referring to steps which are similar to steps in FIG. 7 have the same reference numerals for convenience.

As discussed above, the method of the present invention is executed by a software program. As shown, in step 302 the software program defines a class, referred to as, for example, class A. The class A includes one or more virtual functions and a virtual function table pointer, wherein the class A defines a vector table pointer in one of either user mode or kernel mode. In this description, as noted above, the class A defines a kernel vector table pointer in user mode. An example class A is included below. It is noted that the class A shown below is an example, and the class may have any of various structures.

In step 304 the software program or method defines a placeholder class or empty class. An example interface for this empty class, referred to as class e, is included below. The empty class includes a virtual function and includes a virtual function table pointer.

Figure 8:
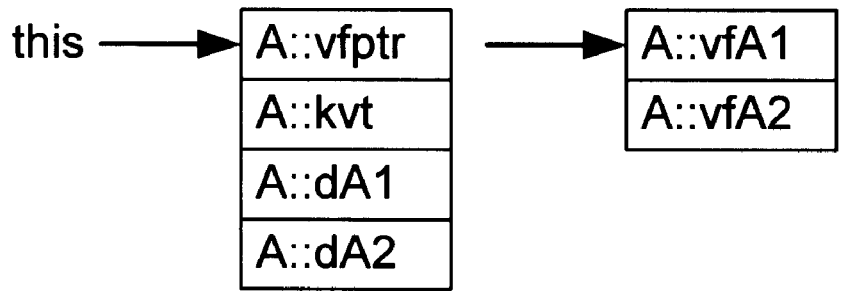
FIG. 8 illustrates the organization of various classes of an example composite class in user mode.
Figure 8:
Figure 8:
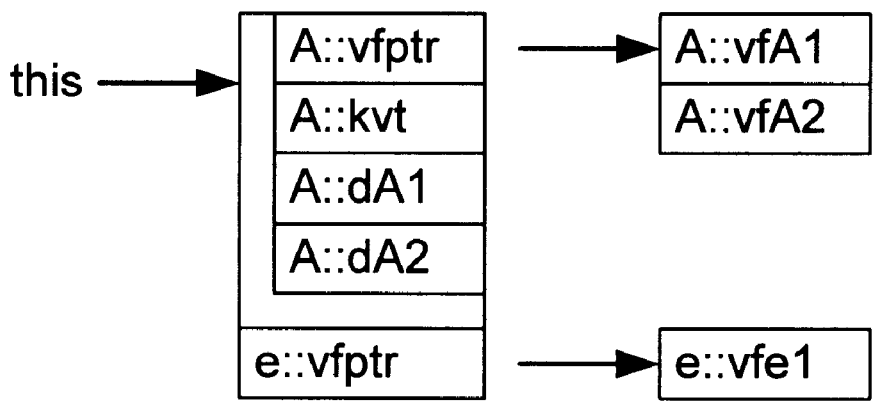
Figure 9:
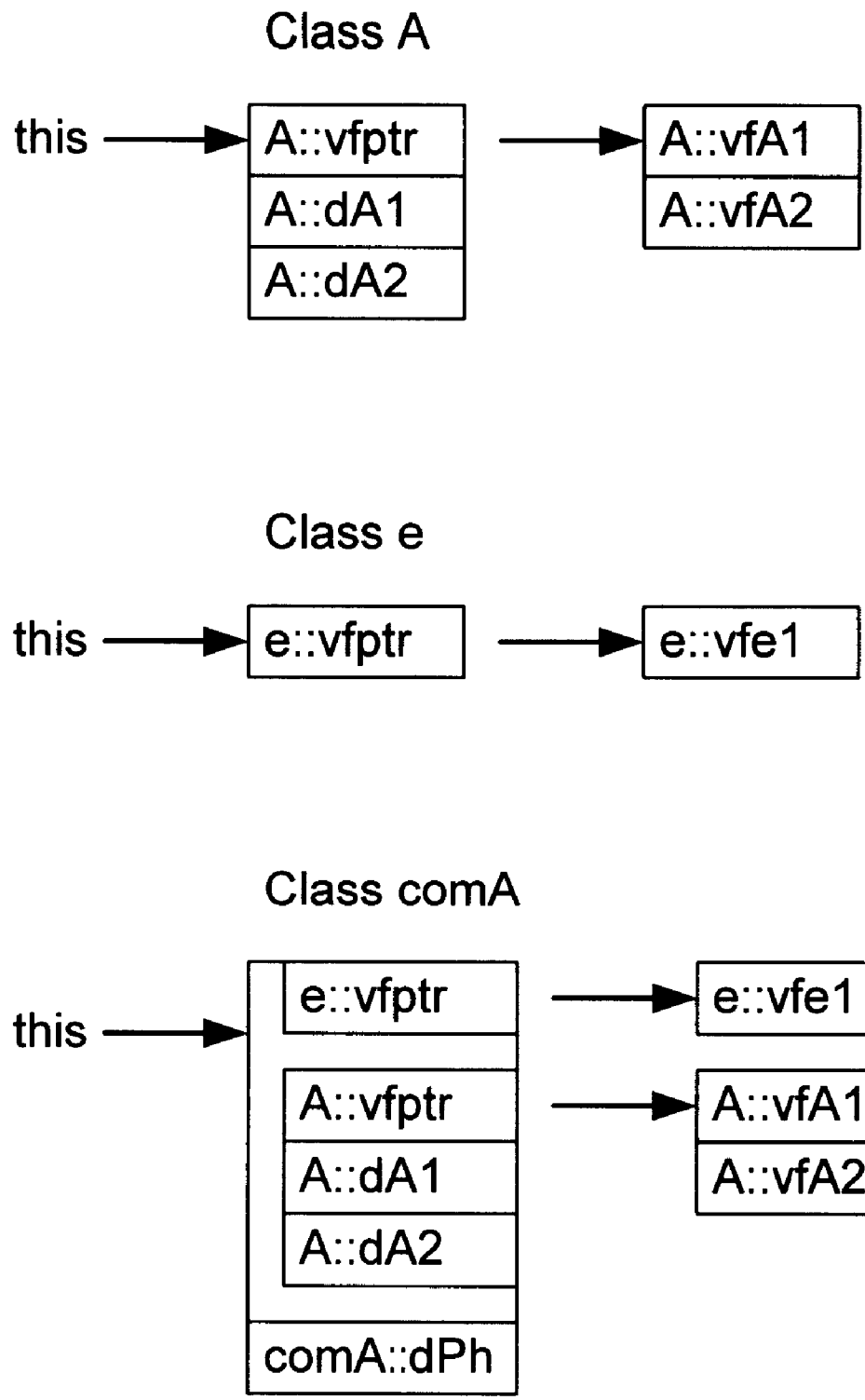
FIG. 9 illustrates the organization of various classes of the example composite class in kernel mode.

In step 306 the software program or method defines a composite class of A. The composite class inherits from the class A and the empty class. The composite class comprises a user mode interface and a kernel mode interface, wherein the user mode interface of the composite class comprises a first order of base classes, and wherein the kernel mode interface of the composite class comprises a second ordering of base classes opposite the first order. Thus, according to the preferred embodiment of the invention, the ordering of the base classes in the interface is reversed for the user mode interface and the kernel mode interface. FIG. 8 illustrates how the various classes are organized in memory in user mode for the example class A, and FIG. 9 illustrates how the various classes are organized in memory in kernel mode for the example class A.

In the preferred embodiment, as noted above, the class A, the empty class, and the composite class are defined by the software program in steps 302, 304, and 306 at compile time. In other words, steps 302–306 are performed during compile time of the software program.

After the above classes are defined in steps 302–306 and the program is compiled, the program is then executed. During program execution, when an object of the composite class is desired to be used, a composite object of the composite class is instantiated in one of either user mode or kernel mode. If the composite object is instantiated in user mode, then steps 312 and 314 are executed.

As shown, when the composite object is instantiated in user mode in step 312, then in step 314 the method operates to store the kernel mode virtual function table pointer for class A in the kernel v-table pointer (kvt) member. Thus, when the composite object is instantiated in user mode, the composite object is amended to include the kernel mode virtual function table pointer for class A. Thus, if a kernel mode software process later desires to access the virtual function table of the composite object, which has been instantiated in user mode, a kernel mode to user mode transition is not required, but rather the virtual function table pointer which exists in the kernel mode can be used from the instantiated object to access the virtual function table.

When the composite object is instantiated in the kernel, i.e., in kernel mode in step 322, then in step 324 the method operates to change the virtual function table pointer (vfptr) for the empty class to the user mode virtual function table pointer (vfptr) for class A. Thus, after step 324, the composite object has been amended to include the user mode virtual function table pointer for class A. Thus, if a user mode software process desires to access the virtual function table of the composite object, which has been instantiated in kernel mode, this user mode pointer can be used to reference the virtual function table without requiring a mode context switch.

As will be appreciated by one of ordinary skill in the art, FIG. 7A illustrates a specific embodiment where the class A defines the kernel vector table pointer in user mode. Since the class A defines a kernel vector table (kvt) pointer in user mode, in user mode the kvt member is used to store the kernel mode virtual function table pointer. If the class A defined a user vector table (kvt) pointer in kernel mode, then in kernel mode the kvt member would be used to store the user mode virtual function table pointer Design and Instantiation of an Example Composite Class in Accordance with FIG. 7A The following comprises an example of the creation of a composite class from a class, referred to as A, as well as instantiation of a composite object from the composite class. The example described below and discussed with reference to FIGS. 8–11 corresponds to the flowchart of FIG. 7A. In this example, assume the existence of a class A that is desired to be used in both user and kernel modes. As shown below, the member between the #if and #endif preprocessor flags (kvt) will only be included in user mode. The interface for A is:

```
class A
{
#if kUserMode
    void *kvt;          // kernel v-table pointer
                        // this member is not need by class A, but
                        // by class comA
#endif
    int dA1;
    int dA2;
    virtual int vfA1;
    virtual int vfA2;
};
```

In order to create a composite class of A, an empty place holder class is first created. The interface for this empty class is:

```
        class e
        {
                virtual void vfe1( );
        };
```

Then the composite class of A is created, referred to as comA. The interface for the composite class in the user mode is:

```
#if kUserMode
class comA: public A, public e
{
};
#endif
```

The interface for the composite class in the kernel mode is shown below. It is noted that the order of the base classes is reversed.

```
#if kKernelMode
class comA: public e, public A
{
        void *dPh;    // place holder data member
};
#endif
```

FIG. 8 illustrates how the various classes are organized in memory in user mode, and FIG. 9 illustrates how the various classes are organized in memory in kernel mode. More specifically, FIG. 8 illustrates how class A, class e, and the composite class, comA, are organized in memory in user mode. FIG. 9 illustrates how class A, class e, and the composite class, comA, are organized in memory in kernel mode.

As described above with respect to step 324 of the flowchart of FIGS. 7 or 7A, when a composite object is instantiated from the composite class in the kernel, the virtual function table pointer for the empty class is changed to the user mode virtual function table pointer for class A. In other words, when a composite object is instantiated in the kernel, the virtual function table pointer for the empty class is changed to the user mode virtual function table pointer for class A.

As described above with respect to step 314 of the flowchart of FIGS. 7 or 7A, when a composite object is instantiated from the composite class in user mode, the kernel mode virtual function table pointer for class A is stored in the kvt member. In other words, when a composite object is instantiated in user mode, the kernel mode virtual function table pointer for class A is stored in the kvt member.

Figure 10:
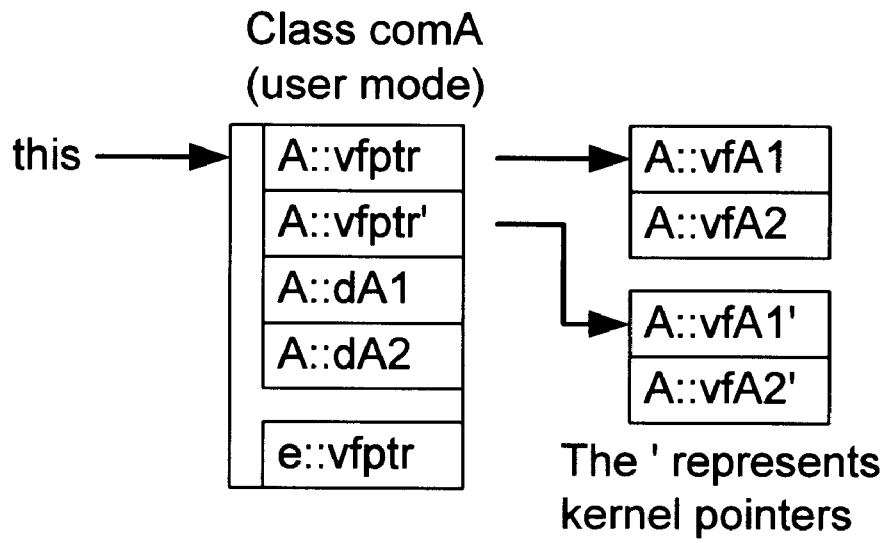
FIG. 10 illustrates the organization of the composite class instantiated in user mode.
Figure 11:
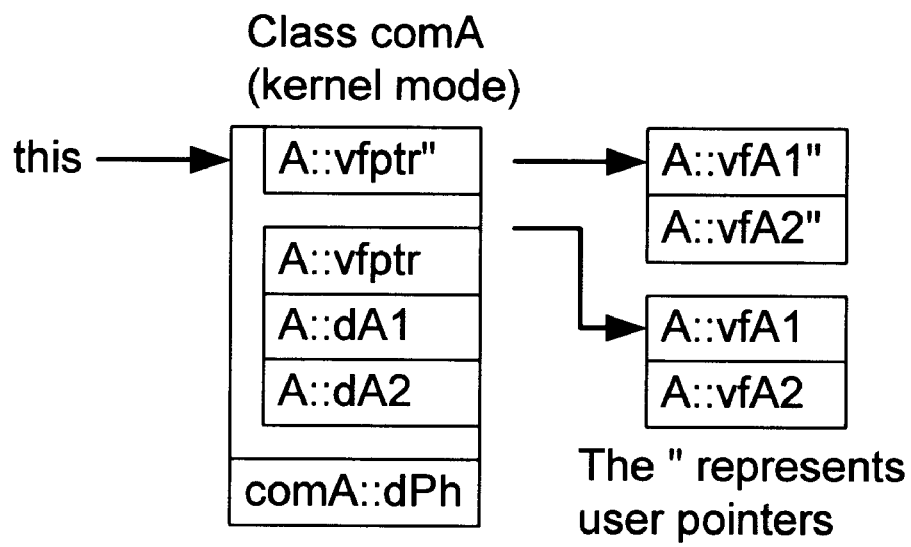
FIG. 11 illustrates the organization of the composite class instantiated in kernel mode

After these changes, the composite object is organized in memory as shown in FIGS. 10 and 11 for user mode and kernel mode, respectively. As shown in FIGS. 10 and 11, the user and kernel class structures for the composite object are very similar. The dA1 and dA2 data members are the third and forth entry in the class structure in both user and kernel modes. Also, the first virtual function table pointer is a user pointer in both user and kernel modes and the second virtual function table pointer is a kernel pointer in both user and kernel modes. Thus the composite object includes both user mode and kernel mode pointers.

When a virtual function is called on the composite object, referred to as object comA, the virtual function table pointer labelled A::vfptr is used in either user mode or kernel mode to resolve the virtual function pointer. If the calling object or process is in user mode, the calling object will use the first virtual function table pointer, which is in user mode. If the calling object is in kernel mode, the calling object will use the second virtual function table pointer, which is in kernel mode. As objects are copied between user and kernel mode, the correct virtual function table pointer is used to resolve the virtual function calls in both user and kernel mode.

Because virtual functions are always available, regardless of where the object was created, or where the virtual function is called, mode switches solely for the purpose of making virtual function calls are no longer necessary. This greatly increases system performance. The design and use of composite classes thus eliminates the need for many user to kernel transitions. It is noted that some transition are still required simply because certain instructions can only be executed in privileged mode. Composite classes take advantage of multiple inheritance and virtual function table pointers in order to circumvent these user to kernel transitions, the composite classes allow direct sharing of objects with virtual functions between user and kernel modes.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for enabling access to an object in both first and second modes with reduced mode transitions, wherein the object is of a class A, the method comprising:
   defining the class A, wherein the class A includes one or more virtual functions and a virtual function table pointer, wherein the class A defines a second mode vector table pointer in the first mode;
   defining an empty class, wherein the empty class includes a virtual function, wherein the empty class includes a virtual function table pointer;
   defining a composite class of the class A, wherein the composite class inherits from the class A and the empty class;
   instantiating a composite object from the composite class in one or more of the first mode or the second mode;
   wherein, if the composite object is instantiated in the second mode, the method comprises:
      changing the virtual function table pointer for the empty class in the composite object to the first mode virtual function table pointer for class A;
   wherein, if the composite object is instantiated in the first mode, the method comprises:
      storing the second mode virtual function table pointer for class A in the second mode vector table pointer;
   wherein the composite object can be shared directly between first and second modes with reduced mode transitions.

2. The method of claim 1, wherein the composite class comprises a first mode interface and a second mode interface, wherein the first mode interface of the composite class comprises a first order of base classes, wherein the second mode interface of the composite class comprises a second ordering of base classes opposite said first order.

3. The method of claim 1, further comprising:
   wherein the composite object is instantiated in the first mode, the method further comprising:
      a second mode process utilizing a virtual function of the composite object after instantiating the composite object in the first mode, wherein the second mode process using the virtual function of the composite object does not require a mode transition.

4. The method of claim 1, further comprising:
   wherein the composite object is instantiated in the second mode, the method further comprising:
      a first mode process utilizing a virtual function of the composite object after instantiating the composite object in the second mode, wherein the first mode process using the virtual function of the composite object does not require a mode transition.

5. The method of claim 1, wherein said defining the class A, said defining the empty class, and said defining the composite class of the class A are performed during compile time;

wherein said instantiating and either of said steps of changing or storing are performed during execution time.

6. The method of claim 1, wherein the method is performed in a software program, wherein the software program executes under the Windows Operating System.

7. The method of claim 1, wherein the first mode comprises one of user mode or kernel mode, and wherein the second mode comprises the other of user mode or kernel mode.

8. The method of claim 7, wherein the composite class comprises a user mode interface and a kernel mode interface, wherein the user mode interface of the composite class comprises a first order of base classes, wherein the kernel mode interface of the composite class comprises a second order of base classes opposite said first order.

9. The method of claim 7, further comprising:

wherein the composite object is instantiated in user mode, the method further comprising:

a kernel mode process utilizing a virtual function of the composite object after instantiating the composite object in user mode, wherein the kernel mode process using the virtual function of the composite object does not require a kernel mode to user mode transition.

10. The method of claim 7, further comprising:

wherein the composite object is instantiated in kernel mode, the method further comprising:

a user mode process utilizing a virtual function of the composite object after instantiating the composite object in the kernel mode, wherein the user mode process using the virtual function of the composite object does not require a user mode to kernel mode transition.

11. The method of claim 7, wherein the first mode is user mode and the second mode is kernel mode.

12. The method of claim 7, wherein the first mode is kernel mode and the second mode is user mode.

13. A memory media which stores a software program which enables access to an object in both first and second modes with reduced mode transitions, wherein the object is of a class A, wherein the software program comprises program instructions which are executable to perform:

defining the class A, wherein the class A includes one or more virtual functions and a virtual function table pointer, where the class A defines a second mode vector table pointer in the first mode;

defining an empty class, wherein the empty class includes a virtual function, wherein the empty class includes a virtual function table pointer;

defining a composite class of the class A, wherein the composite class inherits from the class A and the empty class;

instantiating a composite object from the composite class in one or more of the first mode or the second mode;

wherein, if the composite object is instantiated in the second mode, the program instructions are executable to perform:

changing the virtual function table pointer for the empty class in the composite object to the first mode virtual function table pointer for class A;

wherein, if the composite object is instantiated in the first mode, the program instructions are executable to perform:

storing the second mode virtual function table pointer for class A in the second mode vector table pointer;

wherein the composite object can be shared directly between first and second modes with reduced mode transitions.

14. The memory media of claim 13, wherein the composite class comprises a first mode interface and a second mode interface, wherein the first mode interface of the composite class comprises a first order of base classes, wherein the second mode interface of the composite class comprises a second ordering of base classes opposite said first order.

15. The memory media of claim 13, wherein the composite object is instantiated in the first mode;

wherein a second mode process is operable to utilize a virtual function of the composite object after instantiating the composite object in the first mode, wherein the second mode process is operable to utilize the virtual function of the composite object without requiring a mode transition.

16. The memory media of claim 13, wherein the composite object is instantiated in the second mode;

wherein a first mode process is operable to utilize a virtual function of the composite object after instantiating the composite object in the second mode, wherein the first mode process is operable to utilize the virtual function of the composite without requiring a mode transition.

17. The memory media of claim 13, wherein said defining the class A, said defining the empty class, and said defining the composite class of the class A are performed during compile time;

wherein said instantiating and either of said steps of changing or storing are performed during execution time.

18. The memory media of claim 13, wherein the first mode comprises one of user mode or kernel mode, and wherein the second mode comprises the other of user mode or kernel mode.

19. A method for enabling access to an object in both user and kernel modes with reduced user mode/kernel mode transitions, wherein the object is of a class A, the method comprising:

defining the class A, wherein the class A includes one or more virtual functions and a virtual function table pointer, wherein the class A defines a kernel mode vector table pointer in user mode;

defining an empty class, wherein the empty class includes a virtual function, wherein the empty class includes a virtual function table pointer;

defining a composite class of the class A, wherein the composite class inherits from the class A and the empty class;

instantiating a composite object from the composite class in one or more of the user mode or the kernel mode;

wherein, if the composite object is instantiated in kernel mode, the method comprises:

changing the virtual function table pointer for the empty class in the composite object to the user mode virtual function table pointer for class A;

wherein, if the composite object is instantiated in user mode, the method comprises:

storing the kernel mode virtual function table pointer for class A in the kernel mode vector table pointer;

wherein the composite object can be shared directly between user and kernel modes with reduced user mode/kernel mode transitions.

20. The method of claim 19, wherein the composite class comprises a user mode interface and a kernel mode interface, wherein the user mode interface of the composite class comprises a first order of base classes, wherein the kernel mode interface of the composite class comprises a second ordering of base classes opposite said first order.

21. The method of claim 19, further comprising:

wherein the composite object is instantiated in user mode, the method further comprising:

a kernel mode process utilizing a virtual function of the composite object after instantiating the composite object in user mode, wherein the kernel mode process using the virtual function of the composite object does not require a kernel mode to user mode transition.

22. The method of claim 19, further comprising:

wherein the composite object is instantiated in kernel mode, the method further comprising:

a user mode process utilizing a virtual function of the composite object after instantiating the composite object in kernel mode, wherein the user mode process using the virtual function of the composite object does not require a mode transition.

23. A method for enabling access to an object in both user and kernel modes with reduced user mode/kernel mode transitions, wherein the object is of a class A, the method comprising:

defining the class A, wherein the class A includes one or more virtual functions and a virtual function table pointer, wherein the class A defines a user mode vector table pointer in kernel mode;

defining an empty class, wherein the empty class includes a virtual function, wherein the empty class includes a virtual function table pointer;

defining a composite class of the class A, wherein the composite class inherits from the class A and the empty class;

instantiating a composite object from the composite class in one or more of the user mode or the kernel mode;

wherein, if the composite object is instantiated in user mode, the method comprises:

changing the virtual function table pointer for the empty class in the composite object to the kernel mode virtual function table pointer for class A;

wherein, if the composite object is instantiated in kernel mode, the method comprises:

storing the user mode virtual function table pointer for class A in the user mode vector table pointer;

wherein the composite object can be shared directly between user and kernel modes with reduced user mode/kernel mode transitions.

24. The method of claim 23, wherein the composite class comprises a user mode interface and a kernel mode interface, wherein the user mode interface of the composite class comprises a first order of base classes, wherein the kernel mode interface of the composite class comprises a second ordering of base classes opposite said first order.

25. The method of claim 23, further comprising:

wherein the composite object is instantiated in user mode, the method further comprising:

a kernel mode process utilizing a virtual function of the composite object after instantiating the composite object in user mode, wherein the kernel mode process using the virtual function of the composite object does not require a kernel mode to user mode transition.

26. The method of claim 23, further comprising:

wherein the composite object is instantiated in kernel mode, the method further comprising:

a user mode process utilizing a virtual function of the composite object after instantiating the composite object in kernel mode, wherein the user mode process using the virtual function of the composite object does not require a mode transition.

27. A method for enabling access to an object in both first and second modes with reduced mode transitions, wherein the object is of a class A, the method comprising:

defining the class A, wherein the class A includes one or more virtual functions and a virtual function table pointer, wherein the class A defines a second mode vector table pointer in the first mode;

defining an empty class, wherein the empty class includes a virtual function, wherein the empty class includes a virtual function table pointer;

defining a composite class of the class A, wherein the composite class inherits from the class A and the empty class;

instantiating a composite object from the composite class in one or more of the first mode or the second mode;

modifying the composite object to create a modified composite object, wherein said modified composite object can be shared directly between first and second modes with reduced mode transitions.

28. The method of claim 27, wherein, if the composite object is instantiated in the second mode, said modifying comprises:

changing the virtual function table pointer for the empty class in the composite object to the first mode virtual function table pointer for class A;

wherein, if the composite object is instantiated in the first mode, said modifying comprises:

storing the second mode virtual function table pointer for class A in the second mode vector table pointer;

wherein the composite object can be shared directly between first and second modes with reduced mode transitions.

29. The method of claim 27, wherein the composite class comprises a first mode interface and a second mode interface, wherein the first mode interface of the composite class comprises a first order of base classes wherein the second mode interface of the composite class comprises a second ordering of base classes opposite said first order.

30. The method of claim 27, wherein the composite object is instantiated in the first mode, the method further comprising:

a second mode process utilizing a virtual function of the composite object after said modifying, wherein the second mode process using the virtual function of the composite object does not require a mode transition.

31. The method of claim 27,
wherein the composite object is instantiated in the second mode, the method further comprising:
a first mode process utilizing a virtual function of the composite object after said modifying, wherein the first mode process using the virtual function of the composite object does not require a mode transition.

32. The method of claim 27, wherein said defining the class A, said defining the empty class, and said defining the composite class of the class A are performed during compile time;
wherein said instantiating and either of said steps of changing or storing are performed during execution time.

33. The method of claim 27, wherein the first mode comprises one of user mode or kernel mode, and wherein the second mode comprises the other of user mode or kernel mode.

* * * * *